United States Patent [19]
Cooper

[11] 4,333,305
[45] Jun. 8, 1982

[54] PLANT SPREADER DEVICE FOR A CROP HARVESTER

[76] Inventor: George Cooper, 13841 SW. 252 St., Princeton, Fla. 33032

[21] Appl. No.: 237,879

[22] Filed: Feb. 25, 1981

Related U.S. Application Data

[63] Continuation-in-part of Ser. No. 914,609, Jun. 12, 1978, Pat. No. 4,189,906.

[51] Int. Cl.³ .............................................. A01D 46/00
[52] U.S. Cl. ................................... 56/327 R; 56/16.6; 171/138; 239/673
[58] Field of Search .................. 56/327 R, 16.6, 13.5; 171/14, 31, 138; 414/300; 239/673, 672, 671; 192/597; 130/27 R

[56] References Cited

U.S. PATENT DOCUMENTS

| | | | |
|---|---|---|---|
| 1,405,316 | 1/1922 | Napier | 239/671 |
| 3,403,863 | 10/1968 | Veech | 239/671 |

*Primary Examiner*—Jay N. Eskovitz
*Attorney, Agent, or Firm*—John Cyril Malloy

[57] ABSTRACT

A device for spreading plants, such as tomato vines, generally across the width of an interior chamber of a conventional harvester, such as a tomato harvester, after the vines have been cut from their root systems in a field, fed onto a forward end of a driven inclined chain belt conveyor, pivotally carried on a front end of the harvester, and discharged into a harvester chamber for processing, such as removing the tomatoes from the vines, cleaning, sorting, etc., by existing conventional means. The spreader device comprises a pair of chain conveyors, each comprised of a pair of spaced apart sprockets, rotatably mounted relative to opposed ends of an elongated support member, a chain engaged about the sprockets and extending therebetween, and a plurality of outwardly extending, spaced apart fingers, fixed to the chain at their inner ends along the length of the chain. The pair of chain conveyors are adjustably carried on a beam bridging an upper rear end portion of the chain belt conveyor in a rearwardly diverging angular relation, in positions for their fingers to engage the vines just prior to their discharge into the interior chamber of the harvester, to laterally spread the vines relative to their diverging relationship.

11 Claims, 1 Drawing Figure

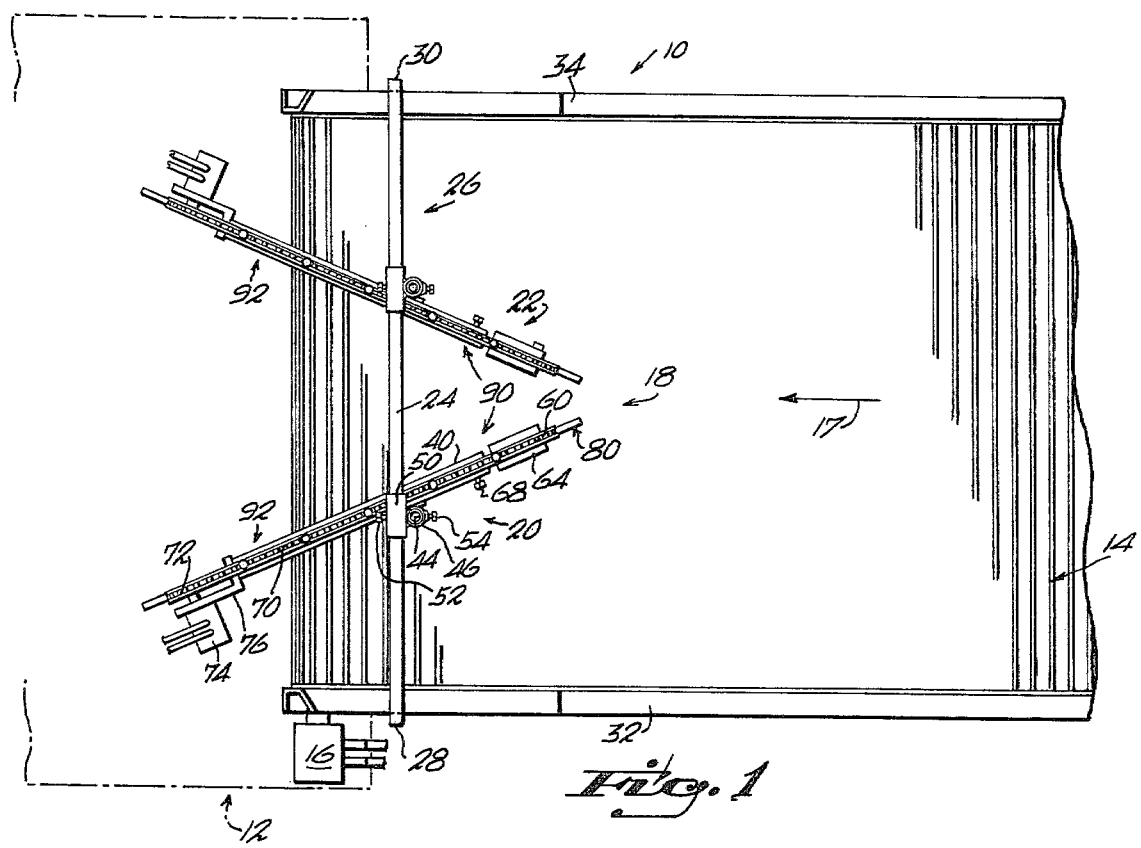
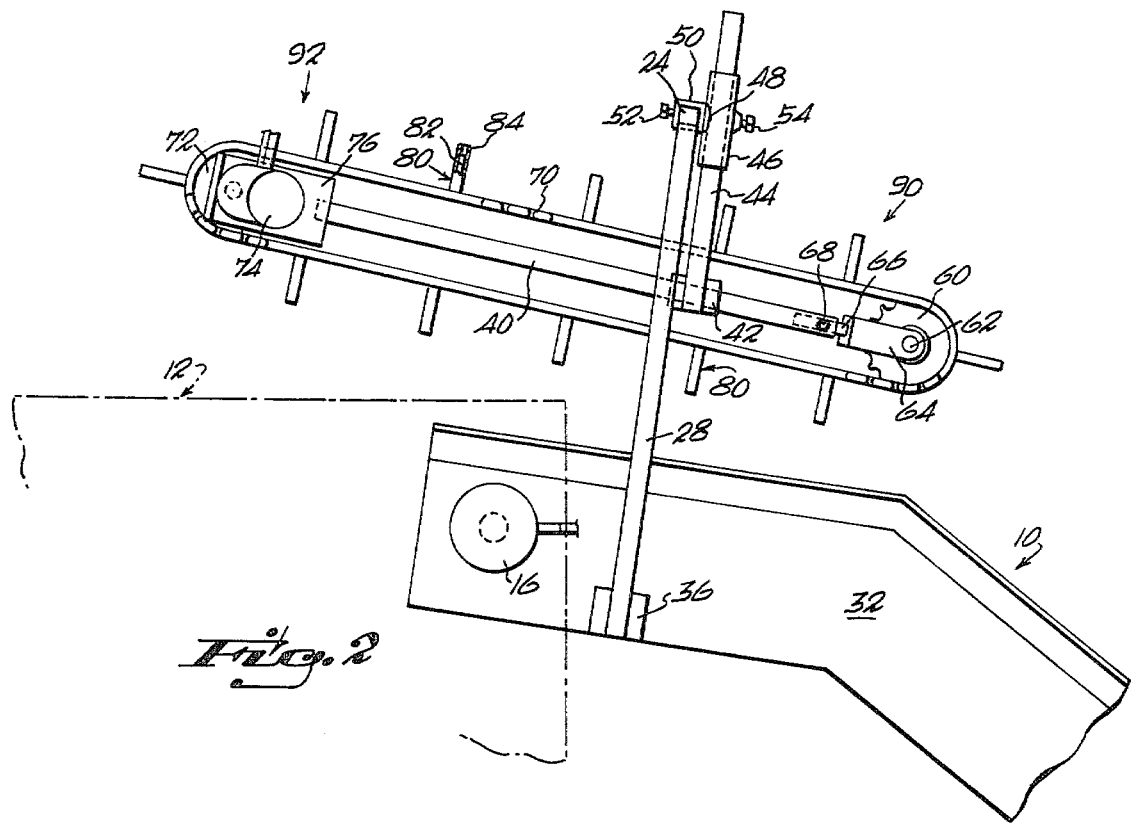

PLANT SPREADER DEVICE FOR A CROP HARVESTER

This is a continuation-in-part of my co-pending patent application, Ser. No. 914,609, filed June 12, 1978, entitled TOMATO HARVESTER ATTACHMENT, Now U.S. Pat. No. 4,189,906, issued Feb. 26, 1980.

BACKGROUND OF THE PRESENT INVENTION

The present invention pertains to an attachment to a crop harvester such as a tomato harvester and, more particularly, to a spreader attachment adjustably carried at a rearward top end portion of an existing chain belt conveyor assembly normally carried on the front end of the main body portion of the harvester. A shear means is disposed centrally of the lower forward end of the conveyor to cut the vines from their root systems, the vines are then fed onto the conveyor for transport thereup into an interior chamber of the harvester where the tomatoes are automatically removed from the vines and thereafter are processed in a conventional manner.

The harvester, in operation, travels along a row of vines which are cut from their root systems and are fed onto the conveyor. Movement of the vines on the conveyor are, in general, confined to a central portion thereof because of the central location of the cutter means. However, it is desirable to spread the vines substantially across the width of the conveyor, as they approach the upper rear end thereof, for discharge into the tomato removal shaker chamber of the harvester.

Therefore, one of the principal objects of the present invention is to provide means to distribute the cut vines across a major portion of the conveyor prior to their discharge onto a shaker means within an interior harvester chamber.

A further object of the invention is to provide a pair of cooperating, rearwardly diverging driven conveyor chains with pluralities of spaced apart outwardly projecting fingers disposed in positions to engage the tomato vines on the upper rearward end portion of the chain belt conveyor, and to spread the vines across the belt conveyor in direct relation to the diverging relationship of the conveyor chains.

A further object of the invention is to provide means to individually adjust the positioning of each of the conveyor chains relative to its vertical position above the chain belt conveyor, as well as the lateral spacing between the two conveyor chains and the angular relationship therebetween.

BRIEF DESCRIPTION OF THE DRAWINGS:

FIG. 1 is a fragmentary top plan view of an upper rear end portion of a conventional chain belt conveyor of a crop harvester device, such as a tomato harvester, with the chain and finger conveyor means of the present invention disposed thereabove; and FIG. 2 is a side elevational view of FIG. 1.

DESCRIPTION OF A PREFERRED EMBODIMENT:

With reference to the drawings in which like reference characters designate like or corresponding parts throughout the views, wherein the numeral 10 generally designates an upper rear end portion of a crop harvester conveyor, such as a tomato harvester, which is conventionally pivotally attached to a forward end portion of the harvester 12, indicated schematically in dot-dash lines. The chain belt conveyor 14 thereof is conventionally driven as by a hydraulic motor 16 in the direction of arrow 17.

The chain and finger conveyor means 18 of the present invention is comprised of a pair of generally identical assemblies 20, 22 disposed in a rearwardly diverging relation, FIG. 1. Both of the chain and finger conveyor assemblies 20, 22 are adjustably carried on a transverse span 24 of a bridge assembly 26 including a pair of opposed end posts 28, 30 connecting between transverse span 24 and side rails 32, 34 of belt conveyor 14 as at 36, FIG. 2. The bridge assembly 26 and connection to rails 32, 34 are accomplished as by welding.

As both chain and finger conveyors 20, 22 are identical, the following description relative to conveyor 20 also applies to conveyor 22. As best illustrated in FIG. 2, an elongated tubular frame member 40 is fixed as by welding, intermediate its length, to a foot 42 fixed to a bottom end of a tubular post 44, slidably engaged through a sleeve 46, fixed as by welding at 48 to a transverse sleeve 50 which is slidable along bridge span 24. Bridge span 24 and transverse sleeve 50 are preferably rectangular in cross section to prevent relative rotational movement of sleeve 50, and a set screw 52, engaged through sleeve 50, provides for fixed lateral positioning of the finger conveyor 20 which is carried by the tubular member 40 in a manner to be subsequently described.

Sleeve 46 and post 44 are preferably round in cross section. Set screw 54, engaged through sleeve 46 permits both up and down and rotational adjustment of post 44 whereby the vertical spacing of chain finger conveyor 20 above chain belt conveyor 14 may be adjusted as well and its angular relation with bridge span 24 and consequently the converging angular relationship of chain and finger conveyors 20 and 22 may be individually or jointly adjusted. In summary, the transverse spacing between the chain finger assemblies 20, 22 may be adjusted as above described as well as the individual vertical and angular positioning thereof.

Referring back to chain and finger conveyor assembly 20, a forward sprocket 60, is rotatably carried on a pin 62 spanning the arms of a yoke 64 including a square rear end pin portion 66 slidably engaged in a front end of tubular member 40, which is square in cross section. A set screw 68, engaged through member 40, provides for proper tensioning of conveyor chain 70 of assembly 20 between sprocket 60 and a rear end drive sprocket 72 carried on the drive shaft of a hydraulic motor 74 carried on a bracket 76 fixed relative to a rear end of tubular member 40. Hydraulic motor 74 is operably connected in an existing hydraulic system of the harvester.

A plurality of fingers 80 extend outwardly from chain 70 in a predetermined spaced apart relation. Each finger 80 is preferably formed of an inner metal pin 82, welded to a link of chain 70, with a somewhat resilient sleeve 84 tightly engaged thereover.

In use, the chain and finger conveyor assemblies 20, 22 are adjusted to a predetermined height, transverse spacing and rearwardly diverging relationship to engage plants, such as tomato vines, to spread said vines over a substantial portion of the width of the existing chain belt conveyor 14 prior to their discharge into the main body portion of the harvester for processing in a conventional manner.

Because of the nature of the vine cutting operation, the vines normally move up a central portion of conveyor 14 from the forward cutting position and the assembly of the present invention is designed to disperse the vines over a substantial portion of its width. It is to be noted that a forward portion of each finger conveyor assembly 20 and 22, indicated generally at 90 overlies the chain belt conveyor 14 while the rear end portion 92 thereof overlies an inner chamber portion of the harvester 12.

What is claimed is:

1. A plant spreader device for a crop harvester, such as a tomato harvester, for discharging plants, such as tomato vines, into and generally across the width of an interior chamber of a conventional harvester after the plants have been cut from their root systems and fed onto a leading end of an existing driven, rearwardly inclined belt conveyor assembly, pivotally carried on a front end of the harvester, the plants normally being transported on a central portion of the belt conveyor from the lower leading end thereof, adjacent to an existing centrally disposed cutter means, to an upper rear end plant discharge portion thereof, said plant spreader device comprising, a bridge fixed in a spanning relation to the upper rear end discharge portion, including a main transverse span portion positioned a predetermined distance thereabove, a pair of conveyor means fixed relative to said main span portion in a depending relation therefrom, and including first end portions, extending rearwardly from first ends, overlying the upper rear end discharge portion in a predetermined spaced above relation, and diverging rearwardly from said first ends with second end portions thereof overlying the interior chamber; means extending outwardly from said pair in positions to engage the plants as they are moved upwardly rearwardly on the central belt conveyor portion, and means to drive said pair in a predetermined direction to spread the plants generally along lines of divergence defined by said pair for discharge by gravity forces, from said second end portions into the interior chamber.

2. The device as defined in claim 1 wherein each of said pair of conveyor means includes a continuous chain engaged around first and second end sprockets, rotatably mounted in respective mounting means in a predetermined spaced apart relation, and frame means connecting between said mountings, including motor means, comprising said means to drive, operably connected to one of said sprockets.

3. The device as defined in claim 2 including means to tension said chain.

4. The device as defined in claim 2 wherein said motor means comprises a hydraulic motor, operably connected in an existing harvester hydraulic system.

5. The device as defined in claim 2 wherein said means to engage comprises a plurality of outwardly extending fingers, fixed to said continuous chain, in a generally vertical plane and in a spaced apart relation.

6. The device as defined in claim 5 wherein each of said fingers is comprised of an inner metal pin, welded to a link of said chain, and a sleeve, formed of a somewhat resilient material, tightly engaged over said pin.

7. The device as defined in claim 2 including means to adjust said pair laterally across said main span.

8. The device as defined in claim 7 including means to adjust said pair in a generally up and down relation.

9. The device as defined in claim 8 including means to adjust said diverging angular relationship.

10. The device as defined in claim 9 wherein said means to adjust in an up and down relation and in said diverging angular relationship comprises a generally upright post, round in cross section, fixed at a lower end to said frame means and having an upper portion slidably engaged through a first sleeve, round in cross section, fixed as by welding to a second sleeve engaged around said main span, and a set screw engaged through said first sleeve for engagement with said upright post.

11. The device as defined in claim 10 wherein said main span and second sleeve are generally rectangular in cross section and including a set screw engaged through said second sleeve, said main span, second sleeve and set screw comprising said lateral adjustment means.

* * * * *